: US 10,868,944 B2
(45) Date of Patent: Dec. 15, 2020

(12) United States Patent
Blanch Pinol et al.

(54) PRINTING FLUID DROP ADJUSTMENT BASED ON MEDIA TEMPERATURE

(71) Applicant: HEWLETT-PACKARD DEVELOPMENT COMPANY, L.P., Spring, TX (US)

(72) Inventors: Marta Blanch Pinol, Sant Cugat del Valles (ES); Diana Canto Estany, Sant Cugat del Valles (ES); Eduardo Amela Conesa, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,506

(22) PCT Filed: May 3, 2017

(86) PCT No.: PCT/US2017/030879
§ 371 (c)(1),
(2) Date: Jul. 29, 2019

(87) PCT Pub. No.: WO2018/203897
PCT Pub. Date: Nov. 8, 2018

(65) Prior Publication Data
US 2019/0389203 A1 Dec. 26, 2019

(51) Int. Cl.
H04N 1/60 (2006.01)
H04N 1/23 (2006.01)
H04N 1/00 (2006.01)

(52) U.S. Cl.
CPC ......... H04N 1/605 (2013.01); H04N 1/00978 (2013.01); H04N 1/2307 (2013.01)

(58) Field of Classification Search
CPC combination set(s) only.
See application file for complete search history.

(56) References Cited

U.S. PATENT DOCUMENTS

| 6,398,333 | B1 | 6/2002 | Mulay et al. |
| 8,939,536 | B2 | 1/2015 | Smith |
| 2005/0063016 | A1* | 3/2005 | Takahashi ............ H04N 1/6091 358/3.24 |
| 2009/0035042 | A1 | 2/2009 | Lee |
| 2014/0168341 | A1 | 6/2014 | Wilsher et al. |

FOREIGN PATENT DOCUMENTS

JP 2005041011 2/2005

OTHER PUBLICATIONS

Mimaki JV300-130/160 Eco-Solvent/Sublimation Printers, May 14, 2014 (7 pages).

* cited by examiner

Primary Examiner — Barbara D Reinier
(74) Attorney, Agent, or Firm — HP Inc. Patent Department

(57) ABSTRACT

In an example, a print system identifies a number of drops to eject corresponding to an expected variation in print fluid based on media temperature and generate print instructions to operate a fluid eject device to that effect. In another example, a print system includes a temperature engine to identify a temperature, a compensator engine to identify a number of drops of print fluid based on the media temperature, and a control engine to generate print instructions to operate a fluid ejection device to place the number of drops of print fluid on media.

17 Claims, 5 Drawing Sheets

702 SET A PRINT APPARATUS TO PRINT A COLOR WITH A MASK OF A PARTIAL NUMBER OF DROPS TO EJECT ONTO A MEDIA IN THE PRINT ZONE OF THE PRINT APPARATUS

704 ADJUST THE MASK BASED ON A DIFFERENCE BETWEEN A SENSED MEDIA TEMPERATURE AND THE EXPECTED MEDIA TEMPERATURE

FIG. 7

802 SET A PRINT APPARATUS TO PRINT A COLOR WITH A MASK OF A PARTIAL NUMBER OF DROPS TO EJECT ONTO A MEDIA IN THE PRINT ZONE OF THE PRINT APPARATUS

804 IDENTIFY THE SENSED MEDIA TEMPERATURE USING SENSOR DATA RECEIVED FROM A SENSOR IN THE PRINT ZONE

806 COMPARE THE SENSED MEDIA TEMPERATURE TO A TARGET MEDIA TEMPERATURE

808 IDENTIFY AN AMOUNT OF MEDIA EXPECTED TO BE AT THE SENSED TEMPERATURE

810 SELECT A MASK ADJUSTMENT BASED ON AN EXPECTED DOT GAIN DIFFERENCE CORRESPONDING TO A DIFFERENCE BETWEEN A DROP OF PRINT FLUID AT THE SENSED MEDIA TEMPERATURE AND A DROP OF PRINT FLUID AT THE EXPECTED MEDIA TEMPERATURE

812 AFTER COLOR HALFTONING IS PERFORMED, ADJUST THE MASK BASED ON A DIFFERENCE IN A SENSED MEDIA TEMPERATURE AND THE EXPECTED MEDIA TEMPERATURE

814 ACTIVATE A DEPLETION FUNCTIONALITY IN A FIELD PROGRAMMABLE GATE ARRAY UNTIL A TARGET MEDIA TEMPERATURE IS REACHED

FIG. 8

PRINTING FLUID DROP ADJUSTMENT BASED ON MEDIA TEMPERATURE

BACKGROUND

Images are processed for use with computing machines, such as a print apparatus. An image may be processed in a print apparatus pipeline or processed offline on a separate compute device, such as a print server. The image data may be processed to operate a reproduction device to control how the image data is reproduced. A print apparatus, for example, may use control data based on processed image data to reproduce a physical representation of an image by operating a print fluid ejection system according to the control data.

BRIEF DESCRIPTION OF THE DRAWINGS

FIGS. 7 and 8 are flow diagrams depicting example methods of compensating print fluid ejection for media temperature.

DETAILED DESCRIPTION

Figure 1:
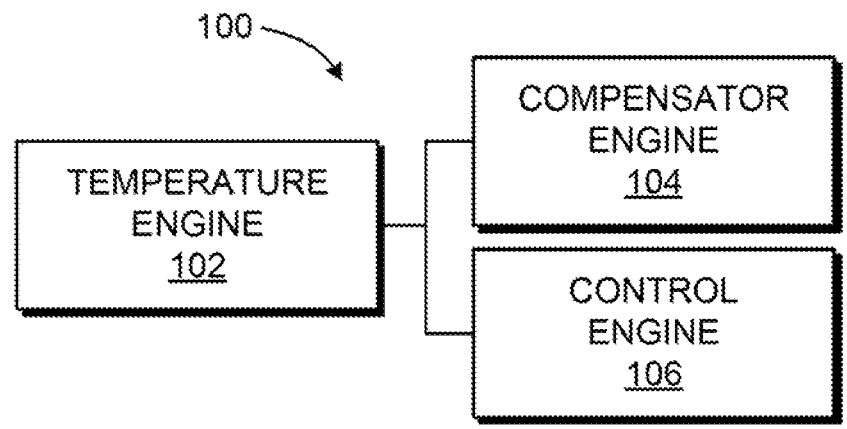
FIGS. 1-4 are block diagrams depicting example print systems.

In the following description and figures, some example implementations of print apparatus, systems, and/or methods of compensating print fluid ejection for media temperature are described. In examples described herein, a "print apparatus" may be a device to print content on a physical medium (e.g., paper, textiles, a layer of powder-based build material, etc.) with a print material (e.g., ink or toner). For example, the print apparatus may be a wide-format print apparatus that prints latex-based print fluid on a print medium, such as a print medium that is size A2 or larger. In some examples, the physical medium may printed on from a web roll or as pre-cut sheet. In the case of printing on a layer of powder-based build material, the print apparatus may utilize the deposition of print materials in a layer-wise additive manufacturing process. A print apparatus may utilize suitable print consumables, such as ink, toner, fluids or powders, or other raw materials for printing. In some examples, a print apparatus may be a three-dimensional (3D) print apparatus. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

Certain examples described herein relate to color calibration of a print system. For example, color calibration may be used to adjust the color response of the print system to more accurately correspond to a desired color to be printed. Color calibration may be used to calibrate a color mapping process by which a first representation of a given color is mapped to a second representation of the same color. The concept of "color" can be represented in a large variety of ways, such as in relation to a power or intensity spectrum of electromagnetic radiation across a range of visible wavelengths or a color model is used to represent a color at a lower dimensionality. A "color" may be said to be a category that is used to denote similar visual perceptions where two colors are said to be similar if they produce a similar effect on a group of one or more people. These categories can then be modelled using a lower number of variables. In an example printing pipeline, individual inks may be calibrated separately so that printed colors are similar to or match desired colors.

A color model may define a color space, i.e., a multi-dimensional space with dimensions of the space representing variables within the color model and a point in the multi-dimensional space representing a color value. For example, in a red, green, blue (RGB) color space, an additive color model defines three variables representing different quantities of red, green and blue light. Another color space includes a cyan, magenta, yellow and black (CMYK) color space, in which four variables are used in a subtractive color model to represent different quantities of colorant or ink, e.g., for a print system and an image with a range of different colors can be printed by overprinting images for each of the colorants or inks. Yet other examples include: the International Commission on Illumination (CIE) 1931 XYZ color space, in which three variables ('X', 'Y' and 'Z' or tristimulus values) are used to model a color; the CIE 1976 (L*, a*, b*-CIELAB or 'LAB') color space, in which three variables represent lightness ('L') and opposing color dimensions ('a' and 'b'); and the Yu'v' color space, in which three variables represent the luminance (Y) and two chrominance dimensions (u' and v').

Various examples described below relate to compensating print fluid ejection based on temperature of the media to be printed on. The calibration may involve identifying a media temperature, determining a number of drops of print fluid based on the media temperature, and generate print instructions to operate a fluid ejection device to place the number of drops of print fluid on the media based on the temperature of the media. By adjusting the number of drops to eject on the media, effects on color due to media expansion from heat and/or changes to dot gain due to the media temperature may be compensated for, for example.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

Figure 2:
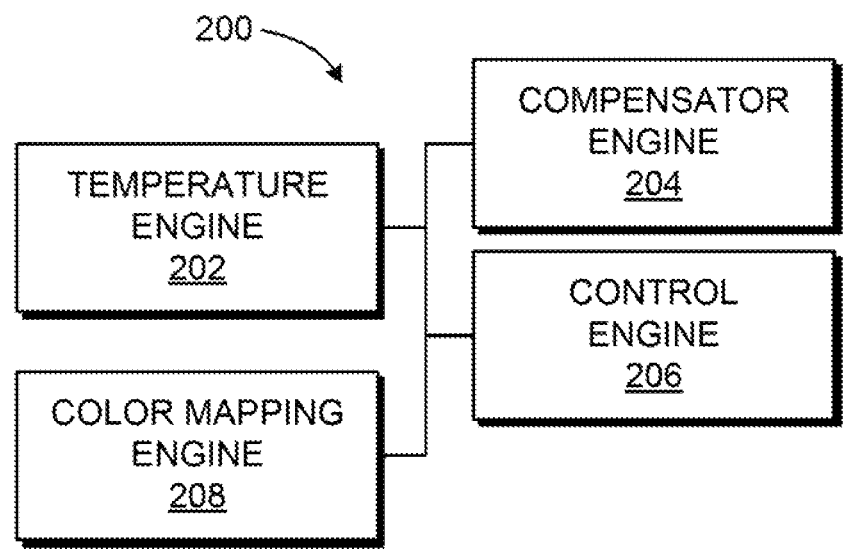

FIGS. 1 and 2 are block diagrams depicting example print systems 100 and 200. Referring to FIG. 1, the example print system 100 of FIG. 1 generally includes a temperature engine 102, a compensator engine 104, and a control engine 106. In general, the temperature engine 102 may obtain the temperature of the media and the control engine 106 may generate instructions to operate a fluid ejection device according to a number of drops of print fluid as determined by the compensator engine 104, which considers the media temperature when determining the number of drops to eject a particular location. Referring to FIG. 2, the example print system 200 may include engines 202, 204, and 206 (that are the same as engines 102, 104, and 106 of FIG. 1) and also include a color mapping engine 208 that performs color mapping operations, such as halftoning, prior to taking into consideration the media temperature.

The temperature engine 102 represents any circuitry or combination of circuitry and executable instructions to identify a temperature of a media to be printed on. For example, a temperature engine 102 may include a temperature sensor and a controller to receive data from the temperature sensor within a print zone of a print apparatus and determine the temperature of the media in the print zone from the sensor data. In another example, there may be multiple temperature sensors such as infrared sensors facing the print zone and pointing to the media input prior to placing print fluid on the media. In that example, the temperature may be determined based on an image of the print zone, which may include information about the media and/or print fluid temperatures. As used herein, a temperature may include a range of temperatures. For example, the print zone may be operating at about 40 degrees Celsius within a tolerance of about 20% due to airflow and the media temperature may be within a range of about 25 degrees Celsius to about 55 degrees Celsius.

The compensator engine 104 represents any circuitry or combination of circuitry and executable instructions to determine a number of drops of print fluid to place on the media based on the temperature of the media. For example, the compensator engine 104 may be a combination of circuitry and executable instructions that cause the circuitry to compare the media temperature identified by the temperature engine 102 to a look up table of color channel effects that provides a number of drops to increase or decrease to compensate for the effect of the media temperature on a color to be, printed on the media. The number of drops to reduce or increase due to the media temperature may be a percentage to reduce across multiple color channels or may be determined per color channel independent of changes to the other color channels. For example, the compensator engine 104 identifies a depletion amount for each color channel based on the temperature of the media, identifies a number of drops to print to reproduces a color that includes a subset of drops for each color channel, and the depletion amount for a first channel (e.g., reduce C by 10%) is independent of the depletion amount of a second channel (e.g., reduce Y by 7%). The independence of the depletion amount may be due to dot gain effects that depend on characteristics of the type of print fluid and/or type of media. In that example, different depletion amounts may be prepared to retrieve depletion amounts. For example, a look-up table corresponding to ink characteristics (such as color and type) and media family (such as material and thickness) may be used by a controller to retrieve a depletion amount. As used herein, a depletion amount refers to a reduction in the number of drops to print with reference to image data for reproduction by a print apparatus. In general, the depletion amount changes according to changes of the temperature of the media to be printed on.

The compensator engine 104 may use a depletion mask on a color channel of color mapped data (e.g., halftone image data). A depletion mask, as used herein, refers to applying a depletion amount (e.g., reduce the number of drops by a percentage) in a pattern as defined by a mask. For example, a color channel may be associated with a matrix of 1 s and 0 s to identify when a drop of the color is to be ejected from a print head and a depletion mask may be a pattern of 0 s to apply to the matrix to remove a certain percentage of the drops previously identified to eject. The compensator engine 104 may determine to apply a depletion mask at the beginning of a print job to eject less print fluid onto media on a platen to compensate for increase dot gain at low temperatures, apply a depletion mask after the first page is printed to compensate for hot media on a belt system, or may apply a default mask pattern to remove 5% of all drops, which may increase if the media temperature drops and decrease if the media temperature increases, for examples.

The compensator engine 104 may determine to apply a different amount of compensation of fluid drops to different portions of the media. For example, the media temperature may be different across a page of print job, to be printed and the number of drops to decrease may be different from the beginning of printing the page to the end of printing the page. The temperature engine 102 may identify a temperature of the media with reference to a print job and with reference to a page of the print job. For example, the temperature engine 102 may identify a first temperature corresponding to a first portion of a page of media to be printed and a second temperature corresponding to a second portion of the page of media. For example, a print apparatus may be relatively cool at startup and may gradually heat up to an expected operational heat level after a period of time. The system 100 may be able to identify the gradual change in temperature and associate portions of the media to be printed on with the temperature ranges as the print apparatus heats up to the expected operation heat level. In general, the compensator engine 104 may identify a difference in a first number of drops to place on a first portion of a page of media and a second number of drops to place on a second portion of the page of media such that a first color corresponding to the first number of drops matches a second color corresponding to the second number of drops. For example, the first portion may have a different dot gain when printed with a certain number of drops of print fluid on the media of a first temperature than the dot gain of the second portion with the media of a second temperature and thus, more or less drops may be placed on the second portion to match the first portion as perceived by the naked eye of a human observer.

The control engine 106 represents any circuitry or combination of circuitry and executable instructions to generate print instructions to operate a fluid ejection device to place the number of drops of print fluid on the media based on the temperature of the media. For example, the control, engine 106 may be a combination of circuitry and executable instructions that cause the circuitry to generate instructions to operate a fluid ejection device of a print apparatus to eject a number of drops for a particular color channel at a location of the media as modified by the number of drops to add or remove to compensate for the effect of the media temperature on the print fluid to be printed and send those instructions to the fluid ejection device.

Referring to FIG. 2, the color mapping engine 208 represents any circuitry or combination of circuitry and executable instructions to perform color mapping operations on image data. For example, the color mapping engine 208 may be a combination of circuitry and executable instructions that cause the circuitry to generate a halftone image. The compensator engine 204 may use the color information resulting from the color mapping engine 208 to determine the number of drops to eject for a given color channel. For example, the compensator engine 204 may identify a depletion mask to apply to the halftone image resulting from the color mapping engine 208 based on the media temperature and the amount of drops to print corresponding to each color channel and the control engine 206 may generate instructions by modifying the halftone image data with the depletion mask to reduce a number of the drops to print as suggested by the halftone image data for each channel (e.g., reduce the number of drops to print by 10%).

The compensator engine 206 may also take into consideration empirical corrections. For example, the system 200 may apply a depletion mask to the digital image once it is halftoned, taking into account the media temperature and some empirical corrections calculated, such as if temperature rises five degrees, the depletion masks removes a 5% of the print fluid with reference to each channel color, the type of ink used, etc. Other example empirical corrections may include primary factors (such as ink type, media type, media temperature, and the like) and secondary factors (such as room humidity, room temperature, ink temperature, and the like).

Figure 3:
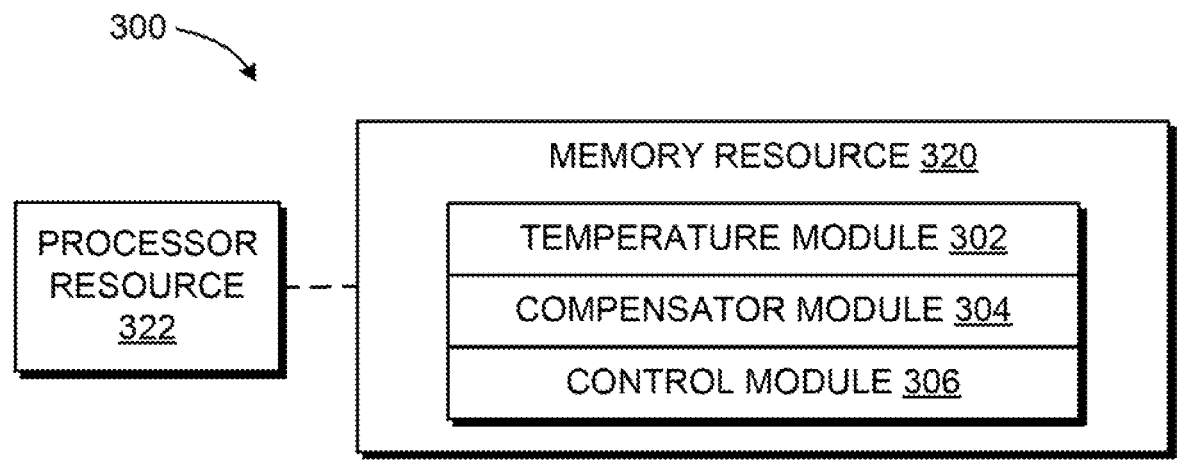
Figure 4:
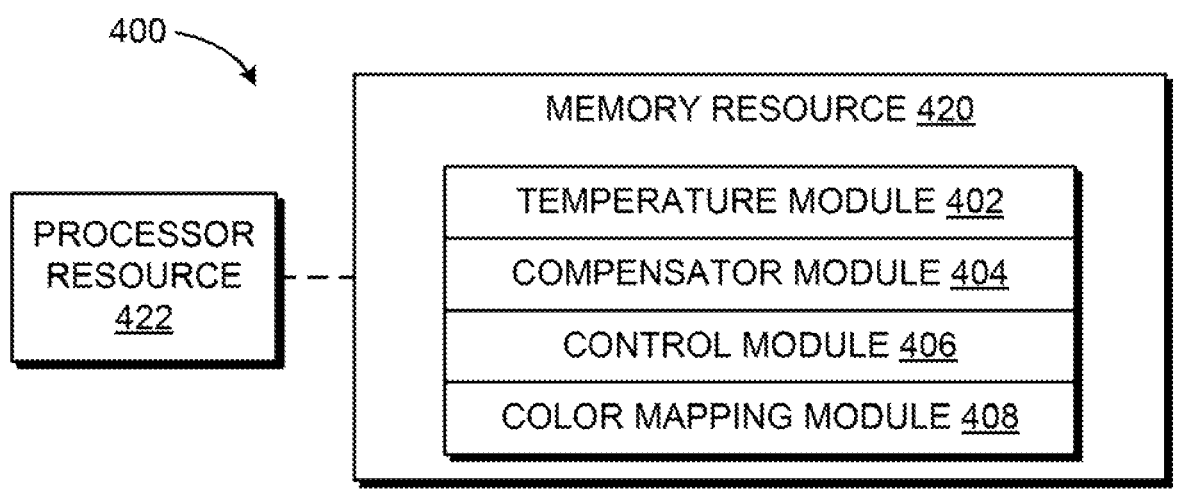

FIGS. 3 and 4 depict the example print systems 300 and 400 may comprise a memory resource (320 in FIGS. 3 and 420 in FIG. 4) operatively coupled to a processor resource (322 in FIGS. 3 and 422 in FIG. 4). Referring to FIG. 3, the memory resource 320 may contain a set of instructions that are executable by the processor resource 322. The set of instructions are operable to cause the processor resource 322 to perform operations of the system 300 when the set of instructions are executed by the processor resource 322. The set of instructions stored on the memory resource 320 may be represented as a temperature module 302, a compensator module 304, and a control module 306. Referring to FIG. 4, the memory resource 420 may include the modules 402, 404, and 406 (that are the same as modules 302, 304, and 306) as well as a color mapping module 408. The temperature module 302, the compensator module 304, and the control module 306 represent program instructions that when executed function as the temperature engine 102, the compensator engine 104, and the control engine 106 of FIG. 1, respectively. With reference to FIG. 4, the color mapping module 408 represents program instructions that when executed function as the color mapping module 208 of FIG. 2. The processor resource 322 may carry out a set of instructions to execute the modules 302, 304, 306, and/or any other appropriate operations among and/or associated with the modules of the system 300 (e.g., such as the color mapping module 408 as referenced in FIG. 4). For example, the processor resource 322 may carry out a set of instructions to identify a number of drops corresponding to an expected color variation based on a temperature of a media and generate print instructions to operate a fluid ejection device to print the number of drops on the media based on the temperature of the media. For another example, the processor resource 322 may carry out a set of instructions to associate the number of drops to a depletion amount corresponding to the temperature of the medium where the depletion amount increases during a period of time if the media temperature is expected to increase during the period of time or the depletion amount decreases during the period of time if the media temperature is expected to decrease during the period of time. For yet another example, the processor resource 322 may carry out a set of instructions to identify a portion of the media to apply the depletion amount based on the temperature of the media at the portion upon entering the print zone and determine an amount of time to apply the depletion amount. For yet another example, the processor resource 422 may carry out a set of instructions to generate a halftone image, determine a color variation associated with a change in dot gain due to a change in media temperature (e.g., a change during printing a page of the print job, a change across an entire print job, etc.), identify a number of drops corresponding to the expected color variation based on the temperature of the media, and generate printer-specific instructions to operate a fluid ejection device to print the number of drops on the media corresponding to a mask (e.g., a depletion mask or a mask to increase the number of drops as applied separately to each color plane) associated with the number of drops identified based on the change in media temperature.

Figure 6:
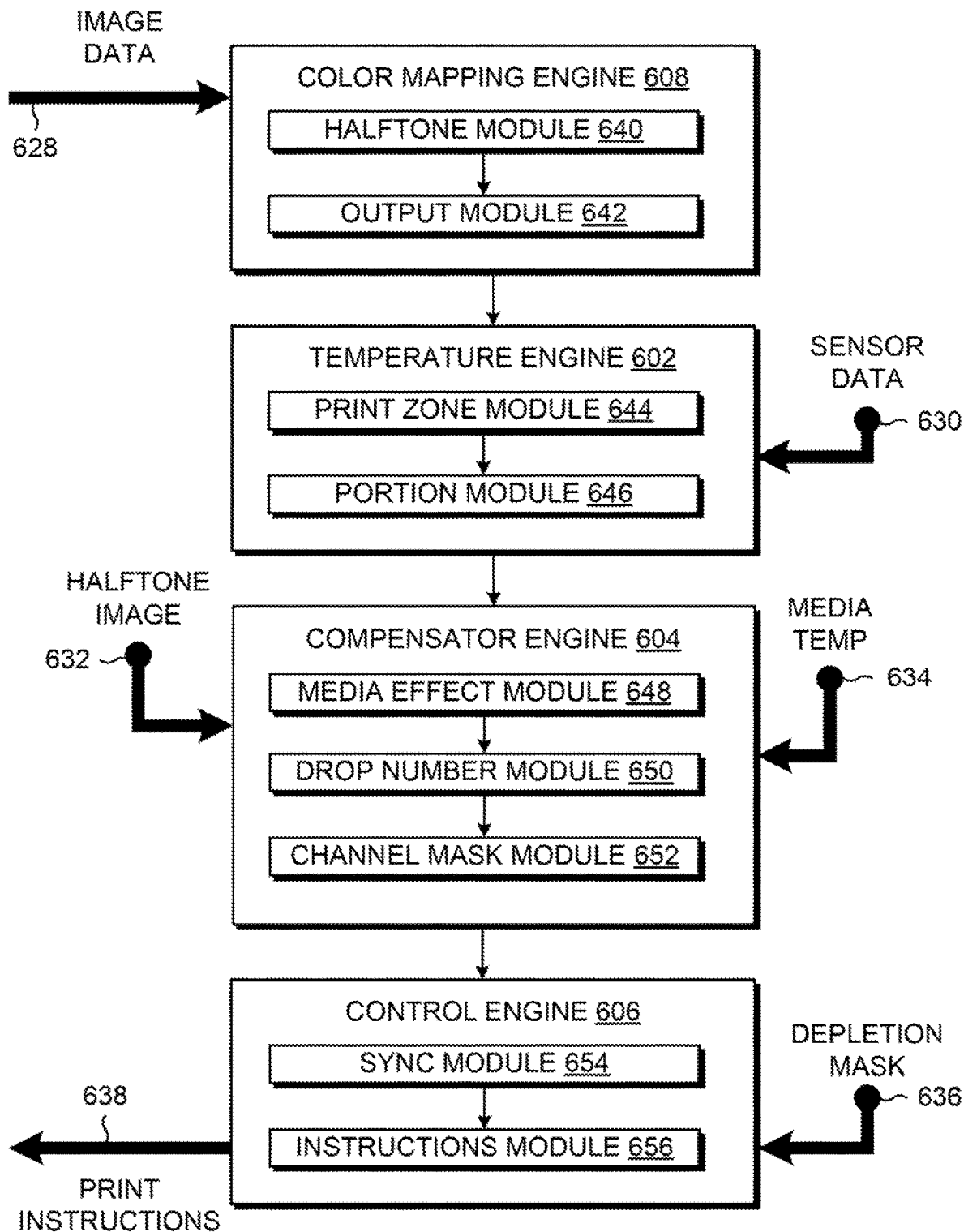
FIG. 6 depicts example components used to implement example print systems.

Although these particular modules and various other modules are illustrated and discussed in relation to FIGS. 3 and 4 and other example implementations, other combinations or sub-combinations of modules may be included within other implementations. Said differently, although the modules illustrated in FIGS. 3 and 4 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 6 depicts yet another example of how functionality may be organized into modules.

A processor resource is any appropriate circuitry capable of processing (e.g., computing) instructions, such as one or multiple processing elements capable of retrieving instructions from a memory resource and executing those instructions. For example, the processor resource 322 may be a central processing unit (CPU) that enables print fluid drop number compensation for media temperature by fetching, decoding, and executing modules 302, 304, and 306. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system (e.g., print system 300). The medium is any non-transitory medium or combination of non-transitory media able to electronically store data, such as modules of the system and/or data used by the system. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource, such as memory resource 420, may be said to store program instructions that when executed by a processor resource cause the processor resource to implement functionality of the system, such as print system 400 of FIG. 4. A memory resource may be integrated in the same device as a processor resource or it may be separate but accessible to that device and the processor resource. A memory resource may be distributed across devices.

In the discussion herein, the components (e.g. engines, modules, and resources) of the systems 100, 200, 300, and 400 have been described as circuitry or a combination of circuitry and executable instructions. Such components may be implemented in a number of fashions. Looking at FIG. 3, the executable instructions may be processor-executable instructions, such as program instructions, stored on the memory resource 320, which is a tangible, non-transitory computer-readable storage medium, and the circuitry may be electronic circuitry, such as processor resource 322, for executing those instructions. The instructions residing on a memory resource may comprise any set of instructions to be executed directly (such as machine code) or indirectly (such as a script) by a processor resource.

In some examples, the systems 300 and 400 may include the executable instructions may be part of an installation package that when installed may be executed by a processor resource to perform operations of the systems 300 and 400, such as methods described with regards to FIGS. 6-8. In that example, a memory resource may be a portable medium such as a compact disc, a digital video disc, a flash drive, or memory maintained by a computer device, such as a print server, from which the installation package may be downloaded and installed. In another example, the executable instructions may be part of an application or applications already installed. A memory resource may be a non-volatile memory resource such as read only memory (ROM), a volatile memory resource such as random access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid state drive (SSD), or an optical drive.

Figure 5:
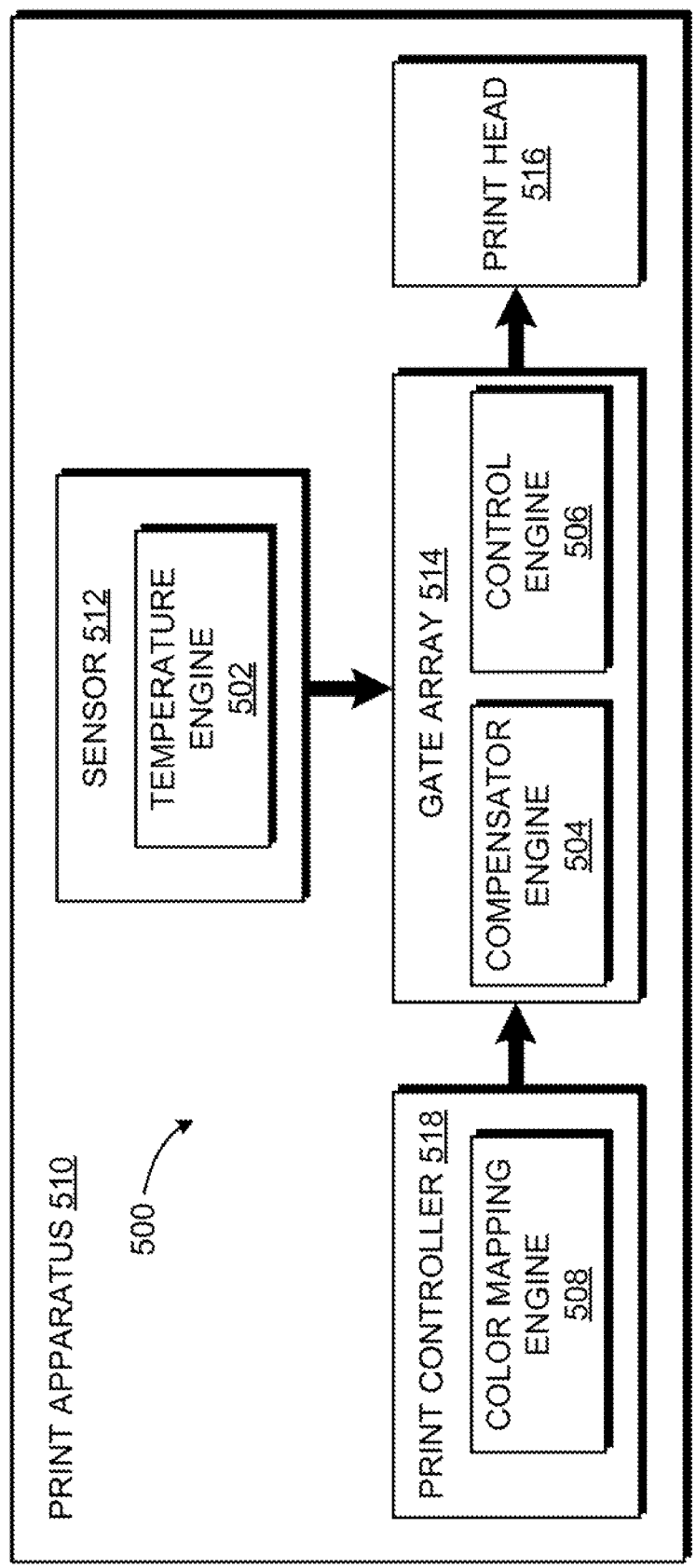
FIG. 5 depicts an example environment in which various print system s may be implemented.

FIG. 5 depicts an example environment in which various print systems for compensating a number of print fluid drops for changes in media temperature may be implemented. Referring to FIG. 5, a print system 500 may be integrated within a print apparatus 510 and the engines 502, 504, 506, and 508 are the same as engines 202, 204, 206, and 208 of FIG. 2. The print apparatus 510 may generally include components such as a print controller 518, a gate array 514, a sensor 512, and a print head 516. The print head 516 may be any appropriate fluid ejection device, such as a thermal inkjet print head or piezo electric print head. In the example environment of FIG. 5, the print system 500 is distributed across components. FIG. 5 depicts the color mapping engine 508 as part of the print controller 518 (e.g., a processor resource coupled to a memory resource with a control program for operating the print pipeline), the temperature engine 502 is located as part of the circuitry of sensor 512, and the compensator engine 504 and control engine 506 are implemented as circuitry of the gate array 514. The gate array 514 is coupled to the print head 516 to provide instructions for operation of the print head 516. For example, the gate array 514 may be a FPGA that programs each pass of the fluid ejection device over media with a depletion mask that changes according to real time information corresponding to the temperature of the media as determined by the sensor 512 by modifying the color mapping data using the media temperature as compensated for by the compensator engine 504.

The components may generally be linked by one or a combination of a cable, wireless connection, fiber optic connection, or remote connections via a telecommunications link, an infrared link, a radio frequency link, or any other connectors of systems that provide electronic communication. The components may be implemented across devices such as between a print server for determining the color mapping and performing compensation operations and a print apparatus with the print head to perform the printing operations. For example, the components may be linked by at least in part, intranet, the Internet, or a combination of both using data communication paths that may include intermediate proxies, routers, switches, load balancers, and the like.

In some examples, functionalities described herein in relation to any of FIGS. 1-5 may be provided in combination with functionalities described herein in relation to any of FIGS. 6-8.

FIG. 6 depicts example components used to implement example print systems. Referring to FIG. 6, the example modules of FIG. 6 generally include a color mapping engine 608, a temperature engine 602, a compensator engine 604, and a control engine 606. The example modules of FIG. 6 may be implemented on a compute device, such as print apparatus or a print server.

Image data 628 is received by the color mapping engine 608 to determine drops to print in each color plane to reproduce the image on media. The color mapping engine 608 of FIG. 6 includes a halftone module 640 and an output module 642 that represent program instructions to assist operation of the color mapping engine 608. The halftone module 640 represents program instructions that when executed cause a processor resource of the color mapping engine 608 to perform halftone operation on the image data to identify color data for each color channel. The output module 642 represents program instructions that when executed cause a processor resource of the color mapping engine 608 to generate the halftone image according to color channel data.

The temperature engine 602 of FIG. 6 includes a print zone module 644 and a portion module 646 to assist performance of the operation of the temperature engine 602. The print zone module 644 represents program instructions that when executed cause a processor resource of the temperature engine 602 to identify a temperature of the print zone using sensor data 630, which may include interpolation of sensor data 630 to identify the temperature of the media in the print zone and/or direct identification of the media temperature via the component supporting the media (e.g., a platen). The portion module 646 represents program instructions that when executed cause a processor resource of the temperature engine 602 to identify a section of the media to which the media temperature applies. For example, a quarter of a page of a print may be printed during the warming up stage of the printer and, therefore, that quarter portion of the page may have a number of print fluid adjusted to compensate for dot gain effect from the difference in media temperature between the quarter portion of the page and the rest of the page.

The compensator engine 604 of FIG. 6 includes a media effect module 648, a drop number module 650, and a channel mask module 662 to assist performance of operations of the compensator engine 604. The compensator engine 604 may receive the media temp 634 and the halftone image data 632 and determine a number of drops to eject to compensate the halftone image data 632 due to the media temp 634. The media effect module 648 represents program instructions that when executed cause a processor resource of the compensator engine 604 to determine an effect of the temperature of the media on the halftone image at a portion of the media to be printed on relative to the previously printed portion and/or the portions to be printed subsequently. The drop number module 650 represents program instructions that when executed cause a processor resource of the compensator engine 604 to determine a number of drops of print fluid for each color channel to compensate for the media effect determined by execution of the media effect module 646. The channel mask module 652 represents program instructions that when executed cause a processor resource of the compensator engine 604 to select a mask, such as a depletion mask 636, for each color channel based on the number of drops identified by execution of the drop number module 650.

The control engine 606 of FIG. 6 include a sync module 654 and an instructions module 656 to assist performance of the control engine 606. The sync module 654 represents program instructions that when executed cause a processor resource of the control engine 606 to synchronize the use of the mask and the portion of media to be affected by the corresponding temperature level. For example, the sync module 654 may apply real time temperature data to constantly change the depletion mask 636, may set a time interval to use the depletion mask 636, or set an amount of media advance to apply the depletion mask 636, for examples. The instructions module 656 represents program instructions that when executed cause a processor resource of the control engine 606 to generate printer-specific print instructions 638 according to the halftone image 532 and depletion mask 636 corresponding to the media temperature 634. The control engine 606 may send the print instructions to a fluid ejection device to operate the fluid ejection device to produce the halftone image with modified number of drops to compensation of the media temperature to, for example, ensure color matching over time of use of a print apparatus where the temperature of the media may change.

The FIGS. 7 and 8 are flow diagrams depicting example methods of compensating print fluid ejection for media temperature. Referring to FIG. 7, example methods of color compensation for media temperature may generally comprise setting a print apparatus to print with a mask of a partial number of drops to eject onto media in the print zone of the print apparatus and adjusting the mask based on a difference in a sensed media temperature and the expected media temperature. The operations discussed with reference to FIGS. 7 and 8 may be performable by the systems discuss herein, such as the engines 102, 104, and 106 of system 100 of FIG. 1.

At block 702, a print apparatus is set to print a color with a mask of a partial number of drops to eject onto a media in the print zone of the print apparatus. The mask may be associated with an expected media temperature in the print zone.

Adjustments may be made to the mask when the media temperature is not at the expect media temperature, for example. At block 704, the mask is adjusted based on a difference between a sensed media temperature and the expected media temperature. For example, all halftone image data may be masked with a 5% depletion mask by default, which may be increased up to 10% or decreased to 0% depending on the temperature of a portion of media relative to the media to be used for the entire print job (which may have an expected media temperature of a heat average associated with normal operation after startup of the print apparatus). The mask to use may be identified and/or adjusted by a compensator engine, such as compensator engine 104 of system 100.

FIG. 8 includes blocks similar to blocks of FIG. 7 and provides additional blocks and details. In particular, FIG. 8 depicts additional blocks and details generally regarding identifying a sensed media temperature, comparing the sensed media temperature to a target media temperature, identifying an amount media expected to be at the sensed temperature, selecting a mask adjustment, and activating a depletion functionality in a FPGA. Blocks 802 and 812 are similar to blocks 702 and 704 of FIG. 7 and, for brevity, their respective descriptions are not repeated in their entirety.

At block 804, the sensed media temperature is identified using sensor data received from a temperature sensor located in the print zone. This may be performed by a temperature engine, such as temperature engine 102 of FIG. 1. At block 806, the sensed media temperature is compared to a target media temperature. The target media temperature may be the expected media temperature, such as an average operational temperature in the print zone during normal operation. The target media temperature may also be a range of temperatures associated with dot gain effects. The difference between the sensed temperature and the target temperature may be an indication of the severity of dot gain changes across prints, for example. At block 808, an amount of media that is expected to be at the sensed temperature is identified. In this manner, media portions may be identified with temperature levels, and the fluid ejection system may be modified to accommodate the changes as the media achieves the various temperature levels. For example, the temperature of the print zone may be taken at a first pass and a mask associated with the temperature may be applied on the subsequent pass.

At block 810, a mask adjustment is selected based on an expected dot gain difference. The expected dot gain difference may correspond to a difference between a drop of print fluid at the sensed media temperature and drop of print fluid at the expected media temperature as affected by media expansion at those temperatures, for example. As stated in block 812, the adjustment to the mask may take place after color halftoning is performed.

At block 814, a depletion functionality is activated in a FPGA until a target media temperature is reached, such as the expected media temperature to apply the default mask or the next level of temperature classification is reached and another adjustment to the mask is made. Other conditions that may end the use of modified mask including performing the depletion functionality until a portion of the media has passed through the print zone or for a limited amount of time, such as an average or maximum warm up time during startup of the print apparatus. For example, the depletion functionality of the FPGA receive temperature information of the print zone in real time and may change the mask adjustment such that the depletion mask changes over time as the media temperature changes over time to allow for dynamic compensation for adverse effects of media temperature.

Although the flow diagrams of FIGS. 5-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A system comprising:
a processor; and
a non-transitory storage medium storing instructions executable on the processor to:
identify a first temperature corresponding to a first portion of a page of media to be printed on;
identify a second temperature corresponding to a second portion of the page of media;
determine a difference in a first number of drops to place on the first portion of the page of media for the first temperature and a second number of drops to place on the second portion of the page of media for the second temperature such that a first color corresponding to the first number of drops matches a second color corresponding to the second number of drops; and
generate print instructions to operate a fluid ejection device to place the first number of drops of print fluid on the first portion of the page of media, and place the second number of drops of print fluid on the second portion of the page of media.

2. The system of claim 1, wherein the instructions are executable on the processor to further:
generate a halftone image; and
identify a depletion mask to apply to the halftone image based on the first temperature, the depletion mask to reduce a percentage of drops to print corresponding to a color channel from drops corresponding to the halftone image.

3. The system of claim 1, wherein the instructions are executable on the processor to further:
change an output image data to reduce or increase drops corresponding to a first color channel to the first number of drops of print fluid identified based on the first temperature.

4. The system of claim 1, wherein the first number of drops to place on the first portion of the page of media corresponds to a depletion amount that changes according to changes of a temperature of the first portion of the page of media.

5. The system of claim 1, wherein the processor comprises a field programmable gate array (FPGA).

6. The system of claim 1, wherein the instructions are executable on the processor to:
determine the first number of drops based on accessing a look up table using the first temperature; and
determine the second number of drops based on accessing the look up table using the second temperature.

7. The system of claim 2, wherein the depletion mask comprises a pattern of 0s to apply to a matrix for a color channel, the matrix comprising an array of 1s and 0s to identify when a drop for a color is to be ejected from the fluid ejection device.

8. The system of claim 2, wherein the instructions are executable on the processor to:
change the depletion mask according to real time changes of a temperature of the first portion of the page of media.

9. A non-transitory computer-readable storage medium comprising instructions that upon execution cause a processor resource to:
receive information of a temperature of a media to be printed on;
identify a depletion amount for each color channel of plural color channels based on the temperature of the media, the plural color channels comprising a first color channel and a second color channel,
wherein the depletion amount for the first color channel indicates a first reduction in a number of drops for the first color channel relative to image data to be reproduced by a print apparatus, and wherein the depletion amount for the second color channel, indicates a second reduction in a number of drops for the second color channel relative to the image data, and
wherein the depletion amount for the first color channel is independent of the depletion amount for the second color channel; and
generate print instructions to operate a fluid ejection device to place a number of drops of print fluid on the media based on the temperature of the media, wherein the number of drops is based on the first reduction in the number of drops for the first color channel and the second reduction in the number of drops for the second color channel.

10. The non-transitory computer-readable storage medium of claim 9, wherein the depletion amount for the first color channel specifies a percentage of drops of print fluid to not fire.

11. The non-transitory computer-readable storage medium of claim 9, wherein the instructions upon execution cause the processor resource to:
identify a portion of the media to apply the depletion amount for each color channel of the plural color channels based on the temperature of the media at the portion upon entering a print zone.

12. The non-transitory computer-readable storage medium of claim 9, wherein the depletion amount for each color channel of the plural color channels is to compensate for color variation associated with a change in dot gain due to a change in media temperature.

13. The non-transitory computer-readable storage medium of claim 9, wherein the instructions upon execution cause the processor resource to;
increase the depletion amount for each color channel of the plural color channels in response to an increase in the temperature of the media during a period of time; and
decrease the depletion amount for each color channel of the plural color channels in response to a decrease in the temperature of the media during the period of time.

14. A method of color compensation for media temperature, comprising:
setting, by a system comprising a hardware processor, a print apparatus to print with a mask of a partial number of drops to eject onto a media in a print zone of the print apparatus, the mask associated with a target media temperature of the media in the print zone; and
adjusting the mask based on a difference in a sensed media temperature and the target media temperature, wherein the adjusting the mask is performed after color halftoning is performed.

15. The method of claim 14, comprising:
determining the sensed media temperature using sensor data received from a sensor in the print zone; and
selecting a mask adjustment for the mask based on an expected dot gain difference corresponding to a difference between a drop of print fluid at the sensed media temperature and a drop of print fluid at the target media temperature.

16. The method of claim 14, comprising:
comparing the sensed media temperature to the target media temperature; and activating a depletion functionality using the adjusted mask until the target media temperature is reached according to sensor data from a sensor in the print zone.

17. The method of claim 14, wherein the adjusting of the mask is based on an expected dot gain difference corresponding to a difference between a drop of print fluid at the sensed media temperature and a drop of print fluid at the target media temperature.

\* \* \* \* \*